June 17, 1969

J. A. HIRSCH 3,450,995

SYSTEM USING SHIFT REGISTER, RING COUNTER AND LOGIC CIRCUITRY FOR CONTROLLING OPERATION IN PREDETERMINED SEQUENCE

Filed Feb. 28, 1966

Sheet 1 of 8

INVENTOR
JAMES ARTHUR HIRSCH
BY Robert Levine
ATTORNEY

INVENTOR
JAMES ARTHUR HIRSCH
BY
Robert Cuine
ATTORNEY

INVENTOR
JAMES ARTHUR HIRSCH
BY Robert Levine
ATTORNEY

INVENTOR
JAMES ARTHUR HIRSCH
BY Robert Lewis
ATTORNEY

INVENTOR
JAMES ARTHUR HIRSCH
BY [signature]
ATTORNEY

June 17, 1969 J. A. HIRSCH 3,450,995

SYSTEM USING SHIFT REGISTER, RING COUNTER AND LOGIC CIRCUITRY FOR CONTROLLING OPERATION IN PREDETERMINED SEQUENCE

Filed Feb. 28, 1966

INVENTOR
JAMES ARTHUR HIRSCH

BY Robert Levine

ATTORNEY

INVENTOR
JAMES ARTHUR HIRSCH
BY [signature]
ATTORNEY

INVENTOR
JAMES ARTHUR HIRSCH
BY Robert Lewis
ATTORNEY

United States Patent Office 3,450,995
Patented June 17, 1969

3,450,995

SYSTEM USING SHIFT REGISTER, RING COUNTER AND LOGIC CIRCUITRY FOR CONTROLLING OPERATION IN PREDETERMINED SEQUENCE

James A. Hirsch, Indianapolis, Ind., assignor to P. R. Mallory & Co. Inc., Indianapolis, Ind., a corporation of Delaware Filed Feb. 28, 1966, Ser. No. 530,661
Int. Cl. H03k 17/28
U.S. Cl. 328—72 27 Claims

ABSTRACT OF THE DISCLOSURE

A control system for a device having a determined sequence of operation which includes a shift register having stages representing the condition of a component of the device, sensing means for advancing the shift register, gating means for advancing the shift register, and circuit means for connecting the shift register and the sensing means to elements of the device thereby energizing the elements during determined steps of the sequence of operation.

The present invention relates to a control system for appliances and more particularly to the means and methods for providing a control system for any appliance having a predetermined sequence of operation.

Generally, it has been the practice to use mechanical timers and stepper switches in conjunction with switches, relays, solenoids, and motors to provide a programming means for an appliance which performs a variety of actions in a sequential fashion. However, where it is advantageous, and in some cases necessary, to vary the time duration of selected steps of the sequence of operation or to vary the sequence itself, mechanical timers and stepper switches become very involved and expensive and their reliability is decreased.

The present invention provides an all electronic system for establishing the sequence of operation necessary to make an appliance operate and for determining the condition of said appliance within said sequence of operation. A ring counter is used to establish the sequence of operation and a shift register is used to determine the condition of the appliance at any time in said sequence of operation. The means and method whereby the ring counter and shift register perform the aforementioned functions will be described in detail in this specification.

The ring counter is far superior to a stepper switch or the like because there are no moving parts which can wear out and which must be constantly adjusted. The ring counter is quiet in operation as compared to a stepper switch or the like.

The control system of the present invention, utilizing a solid state electronic ring counter and shift register, can be easily changed to modify the appliance being controlled. All that is required is the addition of more logic circuits in circuit with the ring counter and the shift register. The number of states of the ring counter and, consequently, the number of steps in the operating sequence of the appliance can be changed without a major overhaul of the equipment as would be required in a mechanical system. Likewise, the number of stages of the shift register can be changed without a major overhaul of the equipment. The control system of the present invention is also very easy to adapt to various applications merely by the addition of logic circuits to the basic system.

Another feature of the control system of the present invention is that the circuitry can be packaged in a dense manner and located well away from operating elements of the appliance being controlled. Hence, the size and shape of the control system does not dictate the design of the appliance.

Other features of the control system of the present invention will become apparent as this specification progresses.

It is an object, therefore, of the present invention to provide a program control means or a control system having the characteristics of flexibility and ease of adjustment.

Another object of the present invention is to provide a control system having a high degree of reliability.

A further object of the present invention is to provide a program control means having a minimum number of mechanical components.

Still another object of the present invention is to provide a control system that is low in cost.

Another object of the present invention is to provide a control system that is light in weight, compact in size, and that can be located remote from the operating elements of equipment being controlled.

A further object of the present invention is to provide a control system having a ring counter for establishing a sequence of operation for an appliance and a shift register for determining the condition of said appliance at any time within said sequence of operation.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which.

Generally speaking, the present invention is a control system for an appliance having a predetermined sequence of operation comprising: a ring counter having a predetermined number of states, each of said states representing a step in said sequence of operation; a shift register hav ing a predetermined number of stages for determining the condition of said appliance at any time within said sequence of operation, each of said stages representing the condition of an element of said appliance; sensing means associated with said elements of said appliance for establishing circuit conditions for advancing said ring counter and said shift register; circuit means for connecting said ring counter to said shift register so as to advance said shift register for predetermined states of said ring counter; second circuit means for connecting said shift register to said ring counter so as to advance said ring counter for predetermined conditions of said shift register; third circuit means for connecting said sensing means to said ring counter and said shift register; and fourth circuit menas for connecting the outputs of said ring counter, said shift register, and said sensing means to elements of said appliance so as to energize said elements during predetermined steps of said sequence of operation.

For a specific application, the present invention is a control system for a copying machine of the type having a means for exposing an intermediate material with an original to be copied, a means for developing copy paper with said intermediate material exposed with said original, and a predetermined sequence of operation, said control system comprising: a ring counter having a predetermined number of states, each of said states representing a step in said sequence of operation; a shift register for determining the condition of said copying machine at any time within said sequence of operation, said shift register having a stage corresponding to said exposing means and a stage corresponding to said developing means; sensing means associated with elements of said copying machine for establishing circuit conditions for advancing said ring counter and said shift register; circuit means for connecting said ring counter to said shift register so as to advance said shift register for predetermined states of said ring counter; second circuit means for connecting said shift register to said ring counter so as to advance said ring counter for predetermined conditions of said shift register; third circuit means for connecting said sensing means to said ring counter and said shift register; and fourth circuit means for connecting the outputs of said ring counter, said shift register, and said sensing means to elements of said copying machine so as to energize said elements during predetermined steps of said sequence of operation.

Figure 1:
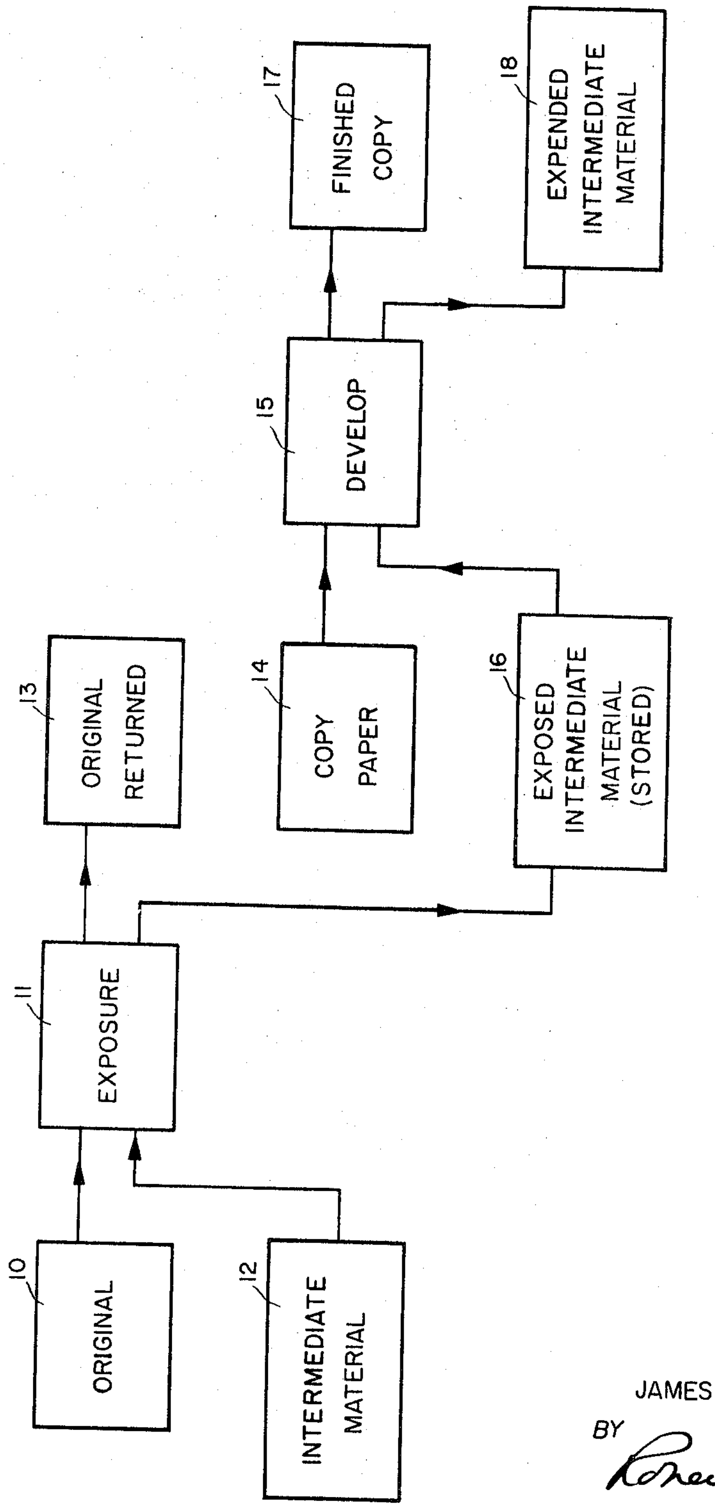
FIGURE 1 is a block diagram of a copying machine which is generic to the more specific embodiments discussed in this specification.

Referring now to the drawing, and particularly to the block diagram of FIGURE 1, the copying machine and the control system of this invention can be visualized in conjunction with the following description. The copying machine is of the type which uses an original copy to expose an intermediate material in an exposure station. This is depicted by the boxes 10, 11 and 12 in the block diagram. After the exposure, the original copy will be returned as is depicted in the box 13. The exposed intermediate material is then stored as is depicted in the box 16 until it is used to develop copy paper as is shown in the box 15. The copy paper, which was originally in the box 14, is transferred to the finished copy box 17. The developed intermediate is transferred to the expended intermediate material station 18. Although the illustrative embodiments of this invention show a continuous sheet of intermediate material, a drum having suitable properties for exposing and developing could be used in a copying machine within the boundaries of the present invention.

Figure 2:
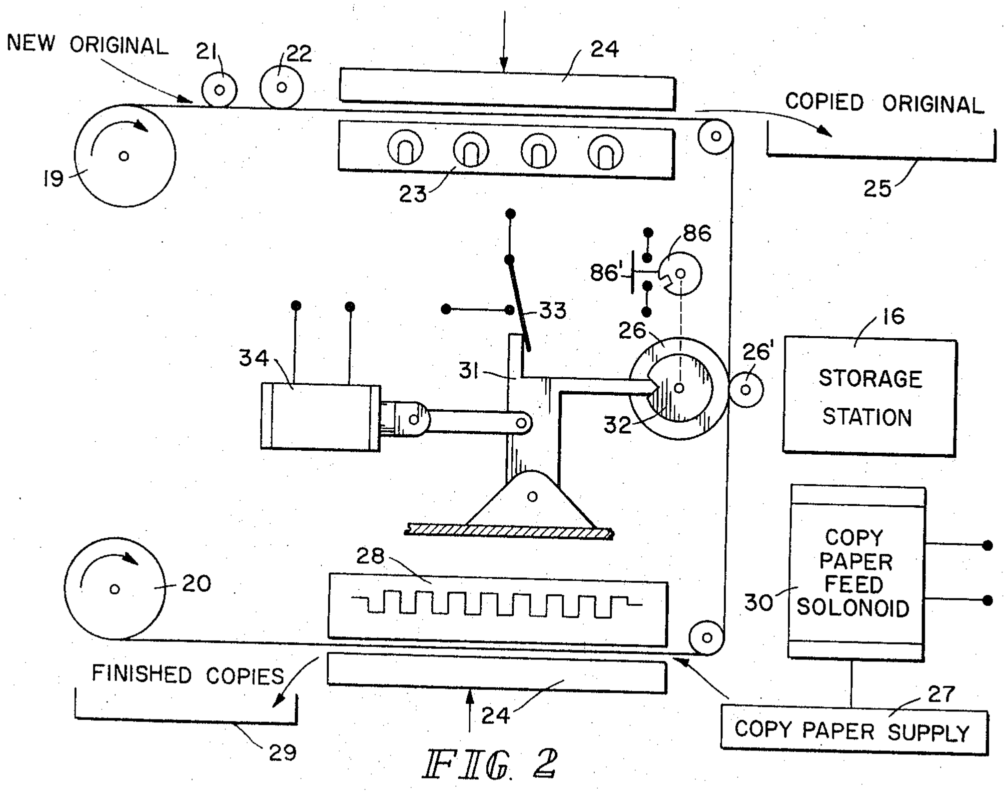
FIGURE 2 is a more detailed block diagram of a copying machine showing elements of said copying machine which are operated by the control system of the present invention.

Referring now to FIGURE 2, a more specific breakdown of the means and method for copying an original can be seen. The intermediate is supplied from the roll 19 and is taken up after developing by the roll 20. The new originals to the copies are inserted between the intermediate and the sponge roller 21 and rubber roller 22 which holds the copy on the moving intermediate. The new original and its associated area of intermediate is moved to exposure station 23 where it is held in place by the clamp 24. It is to be noted that the clamp 24 also serves the developing station 28. That is, when the clamp 28 is operated, both the exposure station 23 and developing station 28 are clamped. After the intermediate is exposed to the original, the original is transferred to the basket 25 and the exposed intermediate is transferred to the storage station 16. The meter rollers 26 and 26′ are a means for moving the intermediate an exact amount for each copying cycle. The operation of these rollers 26 and 26′ will be discussed later in conjunction with the control system of this invention.

The storage station 16 is shown only because of the distance between the exposure station 23 and the developing station 28 in the illustrative embodiment. The storage station, therefore, provides no copying function and could be eliminated if the developing station 28 was placed next to the exposure station 23 so that one advance would move intermediate from said exposure station to said developing station.

Copy paper is taken from the copy paper supply container 27 and is moved with the exposed intermediate to the developing station 28. After developing, the copy is dropped into the copy basket 29 and the exposed intermediate is taken up by the roll 20.

The exposure of the intermediate and the developing of the copy paper takes a predetermined amount of time depending on the chemical makeup of the intermediate and the copy paper, the intensity of the light and heat used, and, to some extent, the nature of the original. These times are provided for in the control system of the present invention.

If we assume that the intermediate is advanced in steps of approximately 16 inches, the following step-advance sequence can be used. On its first step a given 16-inch length of intermediate will advance from the supply roll 19 to the exposure station 23. The next step will carry it to the storage station 16 which is shown adjacent to the meter rolls 26 and 26′. The third step will carry it to the developing station 28 and the fourth step will carry the intermediate to the take up roll 20. The intermediate will remain on the take up roll 20 unless the copying machine drive is operated in reverse.

Nothing happens to the intermediate in the storage station 16. It may be held there for a period of time or moved directly to the developing station 28. At the instant that the exposed section of intermediate leaves the storage station 16, the copy paper feed solenoid 30 is energized to move one sheet of copy paper into the developing station 28 with the exposed intermediate.

With the embodiment shown in FIGURE 2, a requirement for multiple copies would waste intermediate unless the system can run in reverse. That is, when one original is copied and the exposed original associated with that copy is on the take up roll, there is unexposed intermediate in the exposure station 23, the storage station 16, and the developing station 28. If the machine would not operate in reverse, three lengths of intermediate would be wasted. Hence, the control system of the present invention will reverse the copying machine for three steps, thereby placing the used intermediate in the exposure station 23. When the next copy is made, the unexposed intermediate will advance from the supply roll with the original to be copied.

Provisions are made for holding the original to be copied to the clamp 24 so that a series of lengths of intermediate can be exposed as the intermediate advances. Hence, more than one copy of an original can be made without feeding it into the copying machine more than once. The control system of the present invention contains provisions for such a multiple copy activity.

At the place where the original to be copied enters the machine, the sponge roller 21 and rubber roller 22 are provided to hold the original to the intermediate. The rubber roller 22 is spring loaded to press against the intermediate. The paper must pass by the sponge roller 21 before it is engaged by the rubber rollers 22. When the sponge roller 21 is turning, it will help pull the copy into the machine. When the sponge roller 21 is not turning, it will be difficult to even force the copy into the machine. The control system of the present invention stops the sponge roller 21 motor to prevent inserting a new original when there is already an original clamped in the exposure station 23.

The following sequence of operation for providing two copies from one original may be visualized by referring again to FIGURE 2. An original to be copied is conveyed by the sponge roller 21, rubber roller 22, and a length of unexposed intermediate to the exposure station 23. The clamp 24 holds the original and the intermediate is exposed for a predetermined period of time. The intermediate then advances one step and there is exposed intermediate in the storage station 16, unexposed intermediate in the exposure station 23, and the original is held by the clamp 24. At that time, the exposure station 23 operates again for a predetermined period of time. After the exposure, the original is released by the clamp 24 and the intermediate advances another step, at the start of which the copy paper feed solenoid 30 is energized to provide a sheet of copy paper for the developing station 28. At this time there is exposed intermediate in both the storage station 16 and the developing station 28, unexposed intermediate in the exposure station 23, and the original is in the basket 25. The developing station 28 is then operated for a predetermined period of time and the first copy is made. The intermediate is advanced again to move the second exposed section to the developing station 28 and to operate the copy paper feed solenoid 30 which moves copy paper to the developing station 28. The developing station is operated again for a predetermined period of time to make the second copy. The intermediate is advanced again to move the second copy to the copy basket 29. At this point there is unexposed intermediate in the exposure station 23, the storage station 16, and the developing station 28 and the two exposed sections of the intermediate which were used to make the two copies are on the take up roll 20. The intermediate is then reversed three steps to save the unexposed portion.

Any number of multiple copies can be made in the manner hereinbfore described. The control system of the present invention is designed to operate the copying machine in the manner described.

A new original can be inserted into the copying machine each time the intermediate is advanced a step. There is a switch adjacent to the rubber roller 22 which detects whether or not there is an original inserted into the copying machine. With this provision, the sequence is exactly the same as for multiple copies of a single original, except that a new original is fed into the copying machine each time the intermediate is advanced. As long as the switch adjacent to the rubber roller 22 detects an original, the copying machine will continue to turn out copies unless the intermediate or the copying paper is used up.

The control system of the present invention is also designed to make multiple copies of multiple originals. The operator of the copying machine sets the copy counter to the number of copies desired for each original. When the last copy of each original is exposed, the control system will permit the sponge roller 21 to rotate, thereby admitting the next original. Also, the control system will permit the clamp 24 to hold the originals until the correct number of exposures are made from each original.

Figure 3:
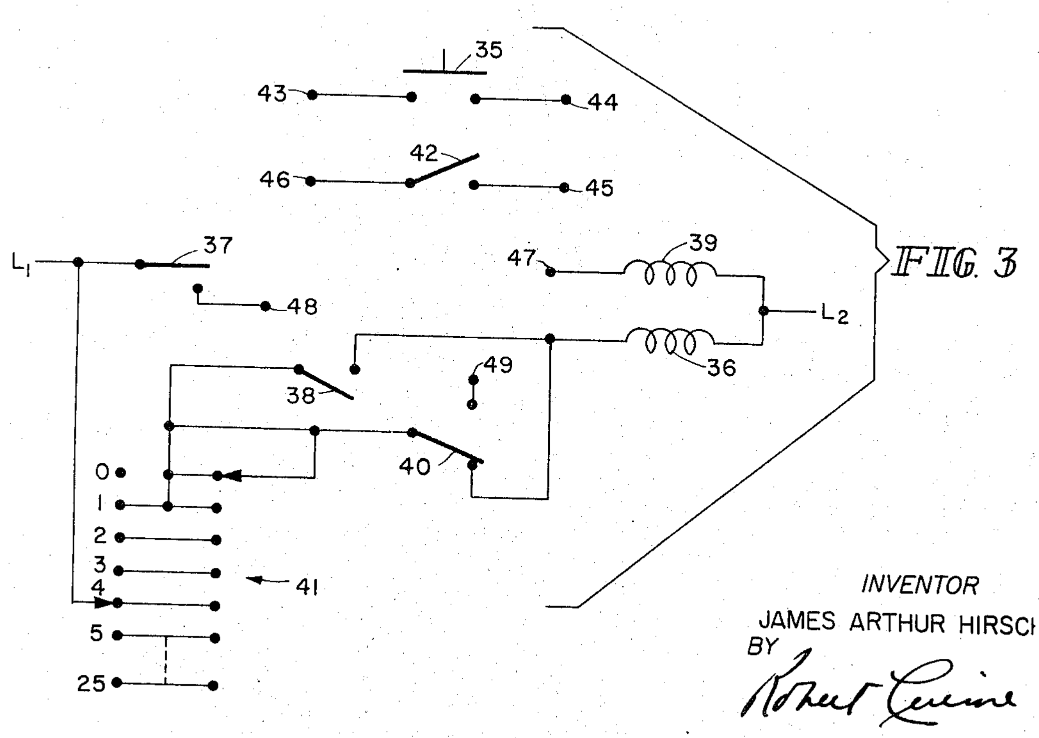
FIGURE 3 is a schematic showing the copy counter portion of the copying machine discussed in this specification.

Another feature which is incorporated into the copying machine and which is facilitated by the control system of the present invention is the copying of material which cannot be fed through a slot, such as the page of a book. The operator of the copying machine will throw a switch which will prevent originals from being placed into the copying machine via the sponge roller 21 and the rubber roller 22. The operator then operates the start button 35 to cause the intermediate to advance one step, thereby placing unexposed inermediate in the exposure station 23. The clamp 24 is then lifted manually to allow the book to be placed on the intermediate and then the clamp 24 is lowered. The start button 35 is operated and the intermediate is exposed for a predetermined time. The operator then lifts the clamp 24 manually, removes the book, replaces the clamp 24, and depresses the start button 35. (The start button 35 is shown in FIGURE 3.) At that time the intermediate advances until the portion exposed to the page of the book is developed in the developing station 28 and further until the copy is dropped into the copy basket 29. The intermediate then runs in reverse for three steps to save the unexposed intermediate.

Other features of the control system of the present invention as applied to a copying machine will become apparent as this specification progresses.

Particular construction features of the copying machine and the control system will be discussed in the following paragraphs. It will become apparent that these discussed features are only illustrative and that other features could be worked out within the framework of the present invention.

The meter roller 26 is one step in circumference. (We previously assumed that one step was approximately 16 inches.) During each rotation a cam 86 which rotates with the meter roller 16, operates a switch 86' forward and backward. These operations occur at rotations of approximately 30° and 300°. At zero degrees, a pawl 31 seats itself into a notch 32 in the roller. Only when this pawl 31 is seated, as determined by the pawl switch 33 is a step considered as complete. To start rotation of the meter roller 26, the pawl solenoid 34 is energized to operate the pawl switch 33, thereby turning on the drive motor for the meter roller 26. During rotation of the meter roller 26, the pawl solenoid 34 is deenergized so that when the pawl 31 is opposite the notch 32, it will fall into said notch to deenergize the drive motor connected to the pawl switch 33.

In order to get satisfactory registration, it is necessary that the pawl 31 approach the notch 32 from one direction only. The pawl 31 usually approaches the notch 32 as the intermediate is being advanced towards the take up roll 20, Hence, when the intermediate is run in reverse, it is necessary to run past the notch 32 and to approach the notch 32 going forward. The motor must, therefore, be reversible while running without excessive overtravel.

The supply roller 19 and the take up roller 20 are held in place by an "intermediate tension motor" which is energized only during the advance of the intermediate.

The clamp 24 is driven by a simple induction motor. Cams are adapted to operate one switch when both the exposure and develop stations are fully clamped and another when the exposure and develop stations are fully unclamped. The clamp 24 cam and switches will be discussed in conjunction with FIGURE 19.

A jam light is ignited whenever a copy does not exit into the copy basket 29 when it should.

Referring now to FIGURE 3, a schematic showing the copy counter portion of the control system can be seen. There is a start switch 35 for starting the copying machine. There is a reset relay 36 which operates the contacts 37, 38 and 42 and a count relay 39 for operating the contact 40. There is also a group of contacts operated by the count relay 39 which can be set manually to determine the number of copies to be made. The manual setting contact is connected directly to $L_1$. The reset relay 36 contacts 37, 38 and 42 are latched into their operated positions when the count relay 39 has not counted above zero. When the count relay 39 is operated and the count relay contacts 41 advance to one, the reset relay 36 contacts 37, 38 and 42 will return to the unoperated position because the manual selector is not set for one copy. The count relay contacts 41 will remain in the energized position as long as the count relay 39 is energized. When the count relay 39 is deenergized, the contacts 41 will move to the unoperated position but the wiper will not advance on release. Each time the count relay 39 is energized, the relay wiper connected directly to the contact 40 will advance to the next count. When the wiper advances to the count of 4 which has been set manually, a circuit will be completed through the manual wiper, the relay wiper, the count relay 39 contact 40 to operate the reset relay 36 which resets the count relay 39 contacts 41 to zero. The energy to the reset relay 36 is removed but the contacts 37, 38, and 42 of the reset relay 36 are mechanically latched in the operated position until the count relay 39 next operates.

Another feature of the copy counter is the fact that the reset relay 36 is always operated when the manual wiper of the count relay 39 is set for one copy. The reason for this and for the terminals 43 through 49 shown in FIGURE 3 will become clear when the invention is discussed further.

Another item used on copying machines for creating a feedback to the control system is a "copying exit switch" used for jam detection. Another such item is a switch for determining when the supply of copy paper has run out.

Referring again to FIGURE 2, the operation of the sponge roller 21 and its driving motor can be further discussed. The following statements will establish when the sponge roller 21 must run and most not run. The sponge roller 21 must not operate at all during the copying of a page of a book. The sponge roller 21 must not operate when an original is still in the entrance opening, as detected by the original feed switch, since the originals might be crumpled. The sponge roller 21 must not operate when the intermediate is advancing since this may allow introduction of an original in an incorrect position with respect to the framing of the intermediate. The sponge roller 21 must not operate when an original is being held in the exposure station 23 by the clamp 24 or there will be two originals in the exposure station 23 at the next exposure. (This would not be the case if the original in the exposure station 23 is going to exit after the current exposure.) The sponge roller 21 must not operate when the machine is copying unless there is an original in the exposure station 23 or the intermediate at that time in the exposure station 23 (and possibly the storage station) will be wasted. Any other time, the sponge roller 21 should operate.

The foregoing discussion has concerned the operating elements of a copying machine and what must happen in sequence in order to make a copy from an original. At this point, it is necessary to discuss the control system of the present invention which was derived for the copying machine. It is also necessary at this point to define two terms which will subsequently be used. They are:

*Sequence.*—That series of events from one start of the drive motor forward until the next start of the drive motor forward.

*Operating cycle.*—That sequence of events from the depression of the start button until the machine returns to the original position where depression of the start button is again necessary. A copy of a page of a book operating cycle requires three start button depressions.

The control system of the present invention will define uniquely where the copying machine is within an operating cycle, or more precisely, which sequence the copying machine is in. At the start of each sequence, the control system determines from sensing switches whether there is an original held in place by the clamp 24, an original in place in the entrance port, or an original about to be inserted by raising the clamp 24 because the copying machine has been switched into a book copying mode. If so, the next sequence will include an exposure and a "1" will be entered in the first register of the control system. If the next sequence will not include an exposure, a "0" will be entered in the first register of the control system.

At the start of each sequence, the contents and state of the storage station are also examined. If there has been a "1" stored for the exposure station 23 (in the first register), the intermediate going into the storage station 16 has been exposed and must be developed before the operating cycle is complete. If a "0" has been stored, there is unexposed intermediate in the storage station 16 and it will not have to be developed. This information is stored in a second register. At the beginning of the advance of the intermediate, the appropriate new information is entered into the first register and the information already in the first register is transferred to the second register. In a similar manner, a third register was created. The third register indicates whether or not the intermediate entering the develop station 28 has been exposed in the exposing station 23.

The means that has been created is known as a "shift register" and more particularly a three bit shift register having seven possible states. The states are interpreted as shown in the following chart at the beginning of the advance of the intermediate. The three digits represent the contents of the exposure station 23 register, storage station 16 register, and developing station 28 register respectively.

100—During this sequence the first original of this operating cycle shall be exposed.

110—During this sequence the second original of the operating cycle shall be exposed.

111—During this sequence an original shall be exposed and a copy shall be developed. Copy paper must be fed at once. Note that exposed original is in the storage station.

011—During this sequence intermediate shall not be exposed but a copy shall be developed. Copy paper must be fed at once. One image is left in storage.

001—During this sequence the last undeveloped image shall be developed. Copy paper must be fed at once.

000—The last image has just been developed for this operating cycle. After going forward one step to eject the last copy, the intermediate shall be run in reverse three steps and the copy machine will be de-energized until the start button is again depressed.

010—Intermediate is not exposed and a copy is not developed during this sequence. As soon as the first step is completed, another advance is initiated.

101—This state impossible to obtain with the system of the present invention. That is, someone has forced an original under the sponge roller 21 while it was stationary.

Figure 4:
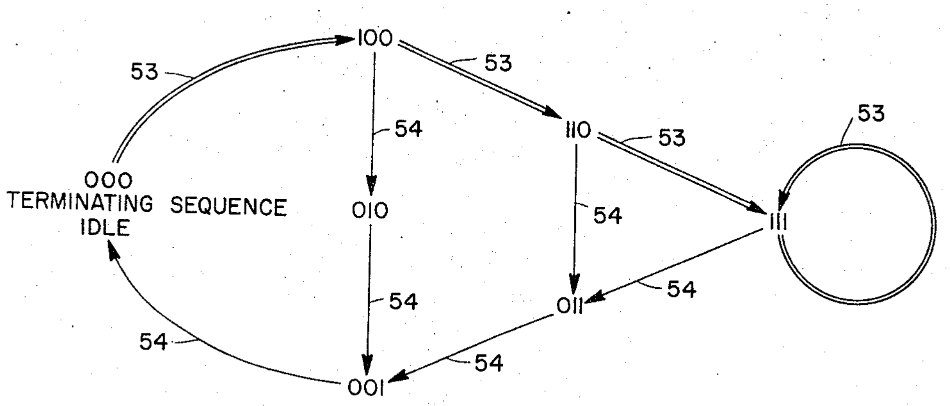
FIGURE 4 is a chart showing how the control system of the present invention progresses from one shift register condition to the next.

Referring now to FIGURE 4, a chart illustrating the manner in which the control system progresses from one shift register condition to the next can be seen. For example, in a single copy operation the register content changes from 000 to 100 to 010 to 001 to 000 as shown by the arrows. In multiple copy operation over three copies the content of the register will remain in condition 111 as long as necessary. The double lines 53 indicate an advance made with a "1" input to the exposure station register, indicating that there will be material to expose in the exposure station 23. The single line indicates a "0" input to the exposure station register.

To this point, the basic requirements of the copying machine for the sequences are defined for each condition of the shift register. Now the sequences must be defined. There are three basic sequences which shall be considered in order of frequency of occurrence. The most frequent is the copy sequence which immediately follows:

(1) Advance intermediate one step. At the start of this step, the copy paper feed solenoid 30 is pulsed if necessary. The meter roller switch 86′ moves to its operated position and returns.

(2) The pawl 31 is seated. In the case of book copy exposure, the start button 35 must be depressed. If a jam has been detected, manual reset of the jam circuitry must be accomplished.

(3) The clamp 24 is operated. Appropriate switching signals are indicated.

(4) Exposure and/or develop. A time period must elapse to permit the completion of developement. If no development is taking place, a different time period must elapse to permit the completion of exposure. (It is assumed that developing takes longer than exposure.) The control system of the present invention contains a timing circuit for exposure and a timing circuit for developing.

(5) The clamp 24 is released. Appropriate switching signals are indicated.

(6) If the jam detection system has detected a blocked exit, manual reset of the jam circuitry must be accomplished. If in a book copy exposure, the start button 35 must be depressed. Otherwise the machine may continue at once.

At the end of the operating cycle, the terminating sequence is also six steps long. These six steps are as follows:

(1) Advance intermediate one step. A time period must elapse before operation of the meter roller switch.

(2) The pawl 31 is seated to indicate that one full step has been accomplished. If a jam has been detected, a time period must elapse before manual reset of the circuitry.

(3) Run reverse one step.

(4) Run reverse a second step.

(5) Run reverse a third step. The pawl 31 will overshoot the notch 32.

(6) Run forward to seat the pawl 31 in the notch 32. Once the pawl 31 is seated, the start switch 35 can again be operated.

In the case of a single copy, the shift register contains 010 at one point. Rather than needlessly go through the same six step sequences described, the machine will remain in the sequence step (1) and cause the signal that would otherwise advance one sequence to advance the shift register instead.

The electronic analogy of a six step device is a six step ring counter. A ring counter will assume only one state at a time and will progress from state to state in an orderly fashion upon the receipt of input pulses. The condition of the copying machine can be determined, therefore, for given states of the ring counter, conditions of the shift register, and conditions of the sensing switches. The ring counter of the control system will be further discussed in the conjunction with FIGURE 21 and the logic circuits of the control system. At this point in the specification, it will suffice to point out that ring counter has six states, state 1 through state 6, and that each state corresponds respectively to the steps (1) through (6) hereinbefore discussed.

Figure 5:
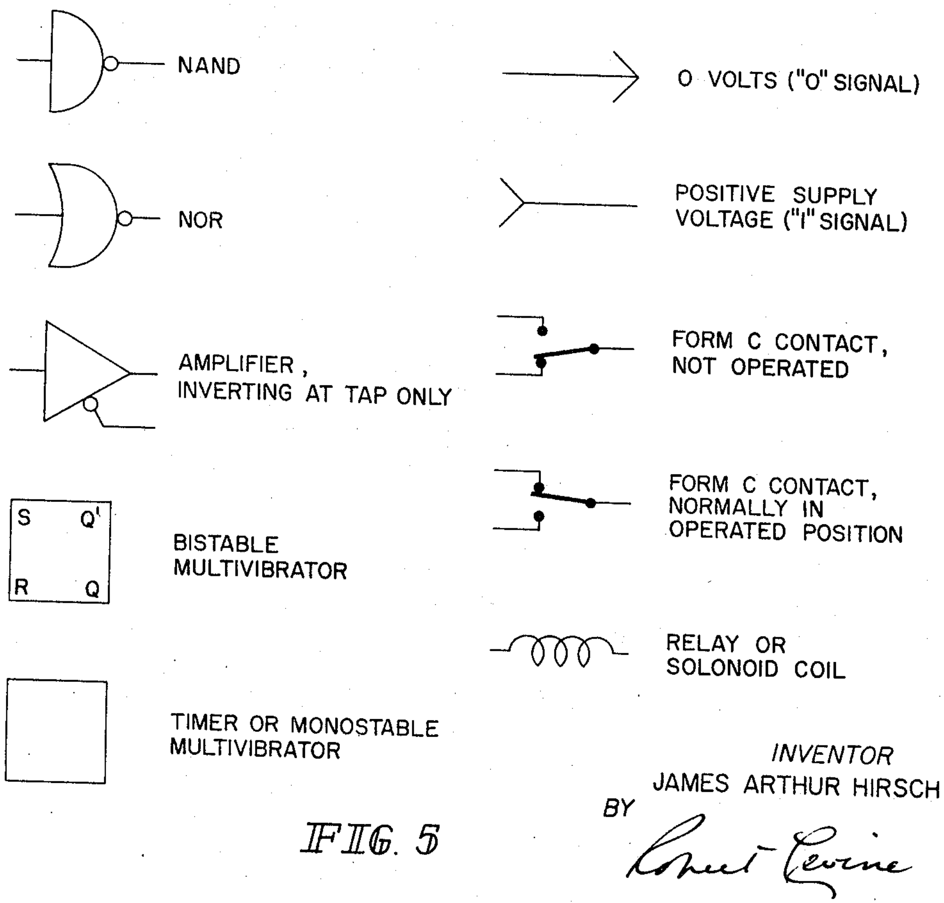
FIGURE 5 is a legend for the symbols used in this specification.

Referring now to FIGURE 5, a chart showing the notations used in the drawing of this specification can be reviewed. Particular attention is called to the signal representing "0" volts or a "0" signal and the postive supply voltage or the "1" signal. It will also be noted that in order to standardize to a degree, the logic function nand is used almost exclusively. The nand function is an "and" function with an inverted output. That is, if the inputs to a nand are A, B, and C, the output from the nand is "0" if and only if A, B, and C are all "1."

The bistable multivibrator shown in FIGURE 5 is referred to as a JK bistable multivibrator which responds to a negative going pulse at the inputs. That is, the JK bistable multivibrator will respond to an input signal going from "1" to "0." When a negative going pulse is inserted at the set S input, the output at the Q terminal becomes "1" and the output at the complement terminal Q′ becomes "0." If a negative going pulse is inserted at the reset terminal R, the output at Q becomes "0" and the output at Q′ becomes "1." If a negative going pulse is inserted at both terminals S and R at once, the output which is "1" becomes "0" and the output which is "0" becomes "1."

Figure 6:
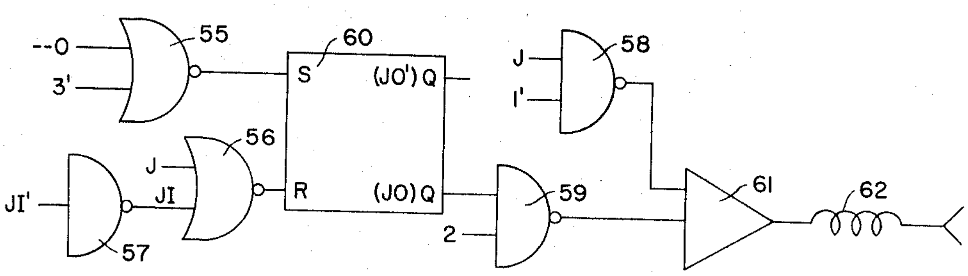
FIGURE 6 is a portion of the logic circuit which operates the jam indicating relay.
Figure 7:
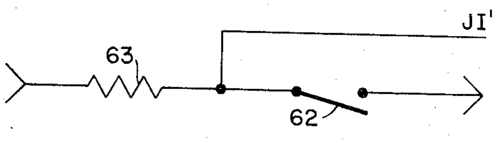
FIGURE 7 is a schematic of the jam indicating relay portion of the control system of this invention.
Figure 8:
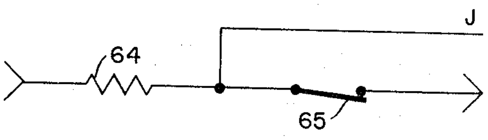
FIGURE 8 is a schematic of the paper exit switch portion of the control system of the present invention.
Figure 9:
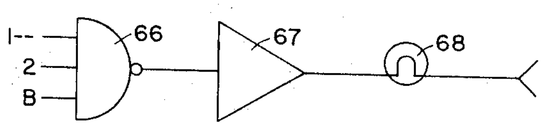
FIGURE 9 is a portion of the logic circuit which operates an instruction lamp of the copying machine.
Figure 10:
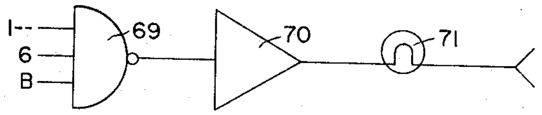
FIGURE 10 is a portion of the logic circuit which operates another instruction lamp of the copying machine.
Figure 11:
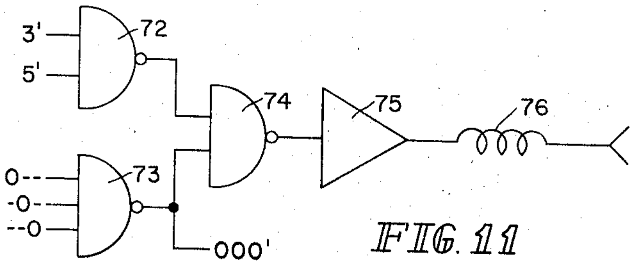
FIGURE 11 is a portion of the logic circuit which operates the clamp motor relay of the copying machine.
Figure 12:
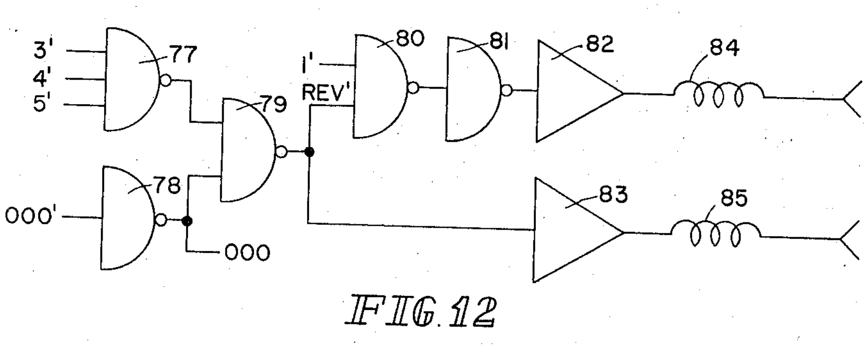
FIGURE 12 is a portion of the logic circuit which operates the pawl relay and drive motor reverse relay of the copying machine.

Referring now to FIGURES 6, 7 and 8, the jam circuitry and logic diagram can be considered. There are two nor gates 55 and 56, three nand gates 57, 56 and 59, a bistable multivibrator 60, an amplifier 61, a jam indicating relay 62 and contact 62′, a resistor 63, a resistor 64, and a paper exit switch 65. A jam, is considered to be detected when the paper exit switch 65 is not operated during any advance of the intermediate that follows development or when the paper exit switch 65 is operated at any time other than an advance. The desired output is the energization of the jam indicating relay 62 which latches itself in to close the contact 62′ and may be reset only by manual means. The jam indicating relay 62 then turns on a light and provides feedback into the control system to indicate that it is operated.

It will be noted that the jam indicating relay 62 is energized through an amplifier 61 because the power required to operate said relay is several orders of magnitude greater than the power level of the remainder of the logic. The output of the amplifier 61 is "0" only if one of the inputs to said amplifier is "0." Because the relay functions as the load resistor of the amplifier 61, the relay is pulled in if the amplifier output is "0."

The paper exit switch 65 is normally closed. Because of this, the voltage at the terminal J is normally "0." When paper is exiting or is otherwise in the exit slot, the voltage is "1." When the ring counter of the control system is in state 1, the signal on the state 1 wire is "1" and the signal on the 1′ wire is "0." When the ring counter is not in state 1, the signal on the state 1 wire is "0" and the signal on the 1′ wire is "1." The same condition holds true for all other state wires for their respective states.

The upper line, designated J, feeding into the amplifier 61 comes from nand gate 58. The output of the nand gate 58 is "0" only when both of its inputs are "1." For both inputs to be "1," the ring counter must not be in state 1 and the paper exit switch 65 must be operated. This is one of the conditions under which a jam is considered to be detected. Since a "0" is fed into the amplifier 61, the jam indicating relay 62 is caused to be operated and, therefore, to be latched.

When the power is first turned on, the bistable multivibrator 60 output at Q is "0." This condition is established by biasing the multivibrator circuit 60 accordingly. As a result of the output at Q being "0," the output of the nand gate 59 must be "0" until the bistable multivibrator 60 is set. Setting occurs when, during a development, the ring counter moves to state 4. This is true because the input wire to the nor gate 55 designated as --0 is "1" only when the developing register records a "0." Hence, as long as the --0 input remains "1," the output of the nor gate 55 will remain "0" regardless of the input at 3′. The input at --0 will remain "1" while developing is not taking place. Once developing is occurring, the input --0 becomes "0" and the output of the nor gate 55 is dependent upon the input at 3′. When the ring counter is not in state 3, the input 3′ is "1" and the output of the nor gate 55 will be "0." When the ring counter enters state 3, 3′ becomes "0" and the output of the nor gate 55 will become "1" providing the input at --0 is still "0." When the nor gate 55 output goes from "0" to "1," the bistable multivibrator 60 will not be set because the signal at S is a positive going signal. However, when the ring counter enters the state 4, the input to the nor gate 55 at 3′ becomes "1" again and the output of the nor gate 55 goes to "0" and the multivibrator is set and Q becomes "1." However, the output of the nand gate 59, into which Q feeds, does not become "0" because the input to said nand gate designated as 2 is "0." If the ring counter advances to state 2 and the multivibrator has not been reset, the output of the nand gate 59 will become "0" and the relay 62 will operate indicating that a jam has been detected.

Before the ring counter will ever get to state 2, the paper exit switch 65 will usually have been operated. Both J and JI are normally "0" so that the output of the nor gate 56 is normally "1." As soon as the paper exit switch 65 is opened, J becomes "1," the output of the nor gate 56 becomes "0," and the bistable multivibrator 60 responds to the negative going pulse at R and is reset. Because the bistable multivibrator 60 is usually reset before the ring counter gets to state 2, the amplifier 61 does not get a "0" input and the relay 62 does not operate.

If no copy paper is fed out of the copying machine, the operator of the machine will presumably determine the reason, clear a jam if it existed, and press the reset switch 42. The bistable multivibrator 60 must be reset or the copying machine will not start. Therefore, the multivibrator 60 will be reset automatically when the relay 62 pulls in and the input JI′ is made "0." A nand gate 57 used as an inverter produces a signal JI which becomes "1" and is fed into the nor gate 56 to reset the multivibrator 60 when the relay 62 proves itself pulled in.

Referring now to FIGURES 9, 10, 11 and 12, the instruction lamp portion of the control system of the present invention can be discussed. The first instruction lamp 68 is cooperatively connected to a nand gate 66 and an amplifier 67. The second instruction lamp 71 is cooperatively connected to the nand gate 69 and the amplifier 70. The clamp motor relay 76, which will be discussed in conjunction with the first instruction lamp 68 and the second instruction lamp 71, is cooperatively connected to the nand gates 72, 73 and 74 and the amplifier 75. The pawl relay 84 and the drive motor reverse relay 85 are cooperatively connected to the nand gates 77, 78, 79, 80 and 81 and the amplifiers 82 and 83. The clamp 24 motor must be on during the clamp and unclamp states. It is turned off when the switches on the clamp cam 117 indicate that the clamp 24 is in the right position. (The clamp cam 117 and switches will be discussed in conjunction with FIGURE 19.) Then, and only then, the ring counter can move to the next state. The clamp states are state 3 and state 5, but will only occur when the condition of the shift register is not 000. (The intermediate will run in reverse when the content of the shift register is 000.)

The inputs 3′ and 5′ are provided to the nand gate 72. When the ring counter is in states 1, 2, 4 and 6, the 3′ and 5′ inputs are both "1" and the output of the nand gate 72 is "0." Only when the ring counter is in the states 3 or 5 is the output of the nand gate 72 "1."

The inputs to the nand gate 73 are 0--, -0- and 0. When all three of these inputs are "1," it is because the content of the shift register is 000. At that time the output of the nand gate 73 will be "0." The nand gate 73 output is shown as 000′ because the output is "0" for the 000 condition of the shift register. Later, this signal, 000′, is inverted to provide "1" when the shift register condition is 000. (This inverted signal is designated as 000.)

A nand gate 74 accepts as inputs the outputs of the nand gates 72 and 73. The output of the nand gate 74 is "0" only when the ring counter is in the states 3 or 5 and the content of the shift register is not 000. This is the time when clamp 24 motor must be operated.

Referring again to FIGURES 9 and 10, it can be seen that the inputs to the nand gate 66 are 1--, 2 and B. The input B is "1" for book copy and "0" for sheet copy. The input 1-- is satisfactory to use because the other two registers must contain "0's" for book copy. When the inputs 1--, 2 and B are all "1," the output of the nand gate 67 is "0" and the instruction lamp 68 will be illuminated through the amplifier 67.

The instruction lamp 71 is illuminated when the clamp 24 releases and the inputs B, 1-- and 6 are "1."

The input to the nand gate 78, used as an inverter, is 000′ and its output is 000. The inputs to the nand gate 77 are 3′, 4′ and 5′, and, therefore, the output of the nand gate 77 is "1" when the ring counter is in states 3, 4 or 5. The output of the nand gates 77 and 78 are fed to the nand gate 79. Hence, the inputs to the nand gate 79 are "1" if the ring counter is in the states 3, 4 or 5 and the condition of the shift register is 000. As a result, the output of the nand gate 79 is "0." This "0" output is fed into the amplifier 83 to operate the drive motor reverse relay 85.

The drive motor is required to run when the output of the nand gate 79 is "0" or when the ring counter is in state 1. By using the nand gate 80 with the output of the nand gate 79 as an input thereto and an additional input 1′, the drive motor will not run when said inputs are "1" and will run when said inputs are "0." The nand gate 81 is used as an inverter because the output of the nand gate 80 is "1" when the drive motor is to run. The inverter output will, therefore, be "0" to the amplifier 82 which will energize the pawl relay 84. The pawl relay 84 operates the pawl 31, which, when pulled, energizes the drive motor as will be discussed later in this specification.

Figure 13:
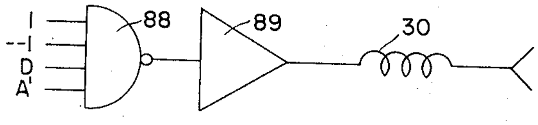
FIGURE 13 is a portion of the logic circuit which operates the copy paper feed solenoid.
Figure 14:
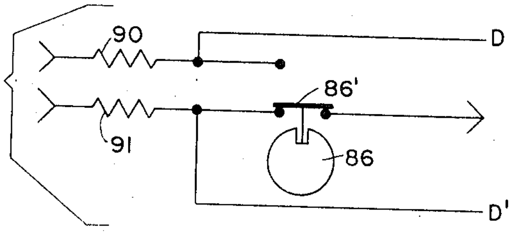
FIGURE 14 is a portion of control system of the present invention which is associated with the meter roller cam of the copying machine.
Figure 15:
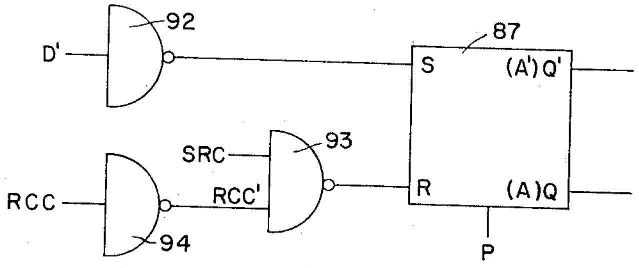
FIGURE 15 is a portion of the logic circuit associated with the drive motor of the copying machine.

Referring now to FIGURES 13, 14 and 15, the cooperative arrangement of the copy paper feed solenoid 30, meter roller 26, cam 86 and the advance multivibrator 87 can be discussed. There is a nand gate 88 and an amplifier 89 connected to the copy paper feed solenoid 30. The meter roller cam 86 operates the switch 86′. Resistors 90 and 91 are cooperatively associated with the meter roller cam 86 circuitry. The nand gates 92, 93 and 94 are cooperatively connected to the advance multivibrator 87.

The meter roller cam 86 is in the same condition whether the intermediate has just started an advance or is about to finish an advance. To remove this ambiguity, the advance multivibrator 87 is introduced. An advance usually starts with both the ring counter and the shift register advancing. However, when the intermediate is running in reverse at the end of an operating cycle, the ring counter alone operates. When two advances occur in order, which is what happens when only a single copy is made, only the shift register advances. To be certain that the advance multivibrator 87 is reset at the appropriate times, the shift register advance pulse, SRC, and an inversion of the ring counter advance pulse, RCC′, are put into the nand gate 93. The nand gate 94 acts as an inverter for the RCC pulse. The RCC′ signal and the SRC signal are normally "1" and the output of the nand gate 93 is, therefore, normally "0." When the level of either the RCC' or the SRC signal drops to "0," the output of the nand gate 93 will be a positive going pulse. The trailing edge of the positive going pulse resets the advance multivibrator 87, causing Q to be "0" and Q' to be "1."

When the meter roller cam 86 starts to turn, the switch 86' operates and the output at D changes from "1" to "0" and the output at D' changes from "0" to "1." The D' output is inverted by the nand gate 92 and is provided to the advance multivibrator 87 as a set 5 input. The output of the nand gate 92 changed from "1" to "0" to provide a negative going pulse for setting the advance multivibrator 87. Hence, before the meter roller 26 and the meter roller cam 86 rotates 30°, the output A of the advance multivibrator is "0" and after it rotates 30° A is "1."

The operation of the copy paper feed solenoid 30 is an example of the use of the output A and A'. The copy paper feed solenoid 30 should operate at the start of an advance if development is going to occur in the sequence. The start of an advance will occur when the ring counter is in state 1 and while the meter roller cam 86 switch 86' has not been operated. Therefore, the inputs to the nand gate 88 are 1, D, A', and --1. When these inputs are all "1," the output of the nand gate 88 is "0" and the amplifier 89 drives the copy paper feed solenoid 30 directly.

Figure 16:
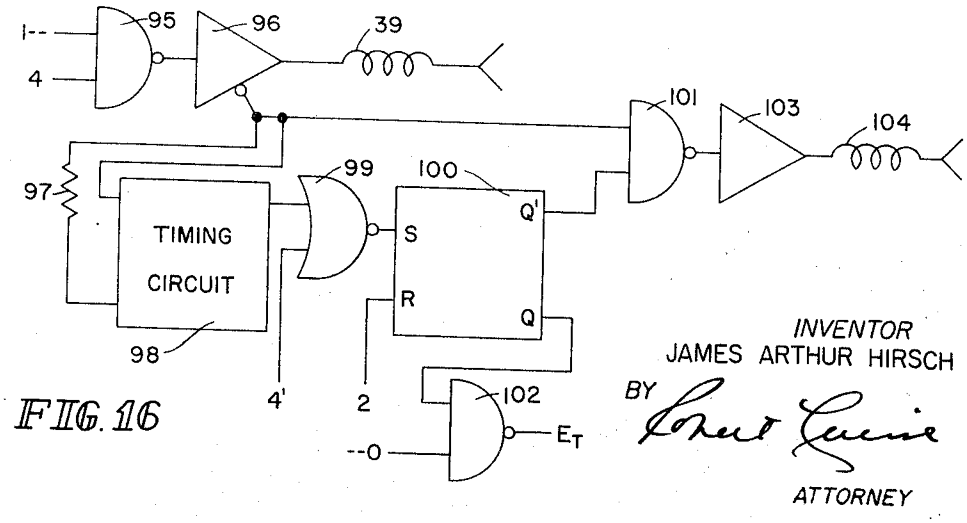
FIGURE 16 is a portion of the logic circuit for operating the exposure station of the copying machine.
Figure 17:
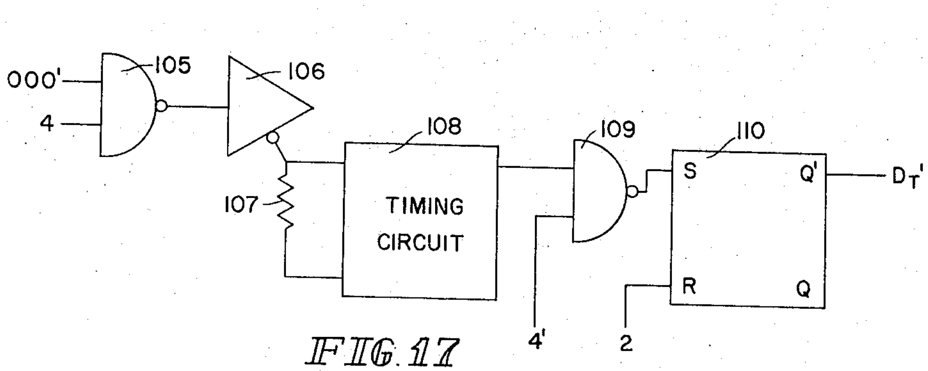
FIGURE 17 is a portion of the logic circuit for operating the developing station of the copying machine.

Referring now to FIGURES 16 and 17, the timing circuits for the control system of the present invention can be reviewed. The timing means for operating the exposure means relay 104 consists of the nand gate 95, amplifier 96, count relay 39, adjustable resistor 97, timing circuit 98, nor gate 99, multivibrator 100, nand gates 101 and 102 and the amplifier 103. The timing means associated with the developing station 28 consists of the nand gate 105, amplifier 106, adjustable resistor 107, timing circuit 108, a nor gate 109 and multivibrator circuit 110.

The count relay 39 must be energized during the exposure operation if it is to count exposures. For reasons which will be established later in this specification, the count relay 39 must be energized during the time when the ring counter is in state 4. That is, the count relay 39 must be energized through the development state if development occurs at the same time as the exposure. Hence, the inputs 1-- and 4 are fed to the nand gate 95 so that the input to the amplifier 96 will be "0" only when exposure is desired. The "0" input to the amplifier 96 causes the count relay 39 to operate.

The amplifier 96 has two stages. The output of the first stage, which is "1" when the input to the amplifier 96 is "0," is applied to the input terminals of the timing circuit 98 to start the timing period. The output of the timing circuit 98 is normally "1" until it times out and a "0" is produced. Because the 4' input to the nor gate 99 is also "0," the output of the nor gate 99 will be "1" when the timing circuit produces a "0" output. The trailing edge of the positive pulse output of the nor gate 99 will set the multivibrator 100. On the next sequence, the multivibrator 100 is reset when the ring counter advances to state 3 and the input 2 to the reset terminal R goes to "0."

The output Q' of the multivibrator 100 is "1" until the timing circuit 98 times out and sets the multivibrator. When both Q' and the input to the timing circuit 98, which is also an input to the nand gate 101, are "1," the exposure means relay 104 will be energized through the amplifier 103.

When the timing circuit 98 times out and sets the multivibrator 100, the output of said multivibrator becomes "1." When no development is to occur, the input --0 is also "1." Since the pulse at Q and --0 are fed into the nand gate 102, the output of said nand gate ET' becomes "0" when the ring counter is to be advanced before the developer timing circuit 108 times out.

The adjustable resistor 97 provides a means for adjusting the period of the timing circuit 98.

The inputs to the nand gate 105 associated with the developer timing circuit 108 are 4 and 000'. Although --1 might at first seem to be a more logical input than 000', the input 000' provides an advantage in that it forces the first and second exposures to be no longer than the set developing time, which would happen on the third and subsequent exposures anyway, as will be noted below. The input 000' also provides a means of advancing from state 4, condition 010, should a malfunction ever cause this situation to exist. The amplifier 106 has no output load. The adjustable resistor 107 is a means for varying the period of the timing circuit 108.

The output Q' of the multivibrator 110 is "1" during all but the end of state 4 for the ring counter. However, when the timing circuit 108 times out and sets the multivibrator 110, the output DT' becomes "0" which is the signal to advance the ring counter. In state 4 of the ring counter, a "0" signal on ET' from the nand gate 102 or DT' from the multivibrator 110 will cause the ring counter to advance.

Figure 18:
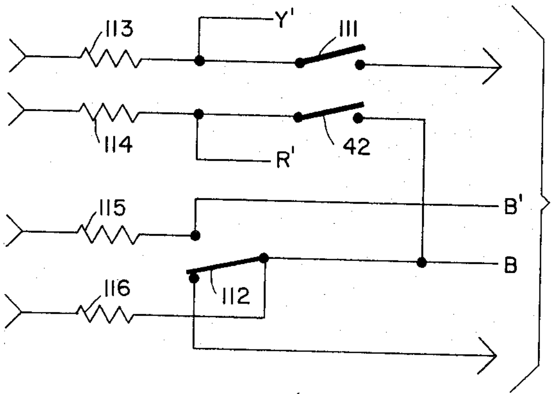
FIGURE 18 is a portion of the control system of the present invention associated with the original feed switch, the reset relay, and the book sheet copying portion of the copying machine.
Figure 19:
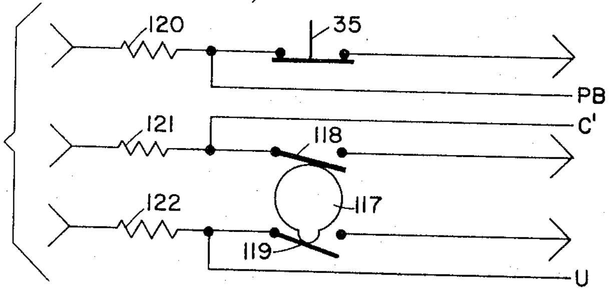
FIGURE 19 is a schematic of the portion of the control system which is associated with the start button and the clamp cam switches of the present invention.
Figure 20:
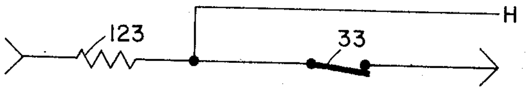
FIGURE 20 is a schematic of a portion of the control system of the present invention which is associated with the pawl switch of the copying machine.

Referring now to FIGURES 18, 19 and 20, a series of miscellaneous inputs that are required to make the ring counter advance can be reviewed. One set of inputs D and D' associated with the meter roller 26 have already been discussed.

FIGURE 18 shows the original feed switch 111, the reset relay contact 42 and the book copy switch 112 cooperatively connected with the resistors 113, 114, 115 and 116. The outputs shown in FIGURE 18 are B, B', Y', and R'.

FIGURE 19 shows the start switch 35, the clamp cam 117 and the clamp cam switches 118 and 119 cooperatively connected with the resistors 120, 121 and 122. The outputs shown in FIGURE 19 are PB, C' and U.

FIGURE 20 shows the pawl switch 33 cooperatively connected with the resistor 123 to provide an output H.

The two clamp switches 118 and 119 are similar. When the clamp 24 is fully operated, the switch 118 is closed and C' becomes "0." When the clamp 24 is not fully operated, the switch 118 is open and C' is "1." When the clamp 24 is fully released, the switch 119 is opened and U is "1." When the clamp 24 is not fully released, the switch 119 is closed and U is "0."

When the pawl 31 is pulled, the pawl switch 33 is closed and H becomes "0." When the pawl 31 is reseated into the notch 32, H becomes "1."

When there is an original placed in the entrance port of the copying machine, the original feed switch 111 is closed and Y' becomes "0." When there is no original in the entrance port of the copying machine, Y' is "1." When the start switch 35 is depressed, the circuit is opened and PB becomes "1." When the start switch 35 is released, PB is "0."

The book copy switch 112 makes B "1" and B' "0" when the copying machine is set up to copy the page of a book. Conversely, the book copy switch 112 makes B "0" and B' "1" when the copying machine is set for sheet copy. When B is positive, R' is necessarily positive because there is no path to "0." When the copying machine is set up for sheet copying and the reset relay 36 contact 42 moves to its unoperated position because more than one copy of an original is to be made, R' will become "0" and remain "0" until the reset relay 36 is again energized and latches into its operated position. Thus, R' is "0" when and only when an original is being held in the place by the clamp 24. Should the copying machine be operated in the book copy mode with the copy counter in a position other than for one copy, the provision for R' getting its "0" through B will keep the copying machine from operating in a multiple copy mode.

Figure 21:
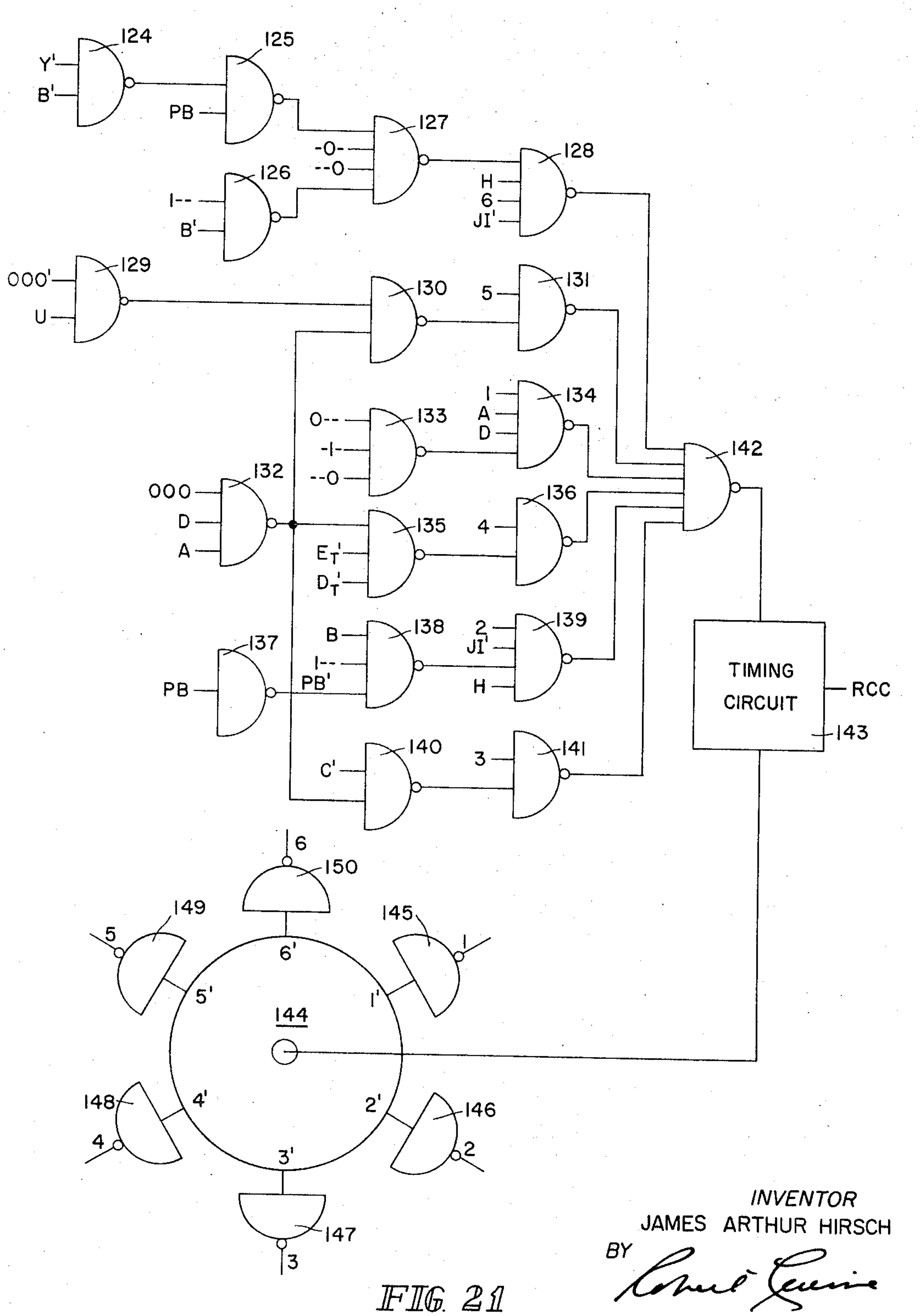
FIGURE 21 is a schematic of a portion of the logic circuit of the present invention showing the logic circuits associated with the ring counter of the control system.

Referring now to FIGURE 21, the ring counter 144 that has been repeatedly referred to and its associated logic can be discussed. The nand gates 124 through 142, the timing circuit 143, and the nand gates 145 through 150 are associated with the ring counter 144 in a manner that will be discussed in the following paragraphs.

It will be remembered that the discussion hereinbefore presented established the six states of the ring counter as well as the requirement for advancing from state to state.

To start the study of the logic circuitry associated with the ring counter 144, it will be assumed that the ring counter 144 is is state 6. The next state for the ring counter is state 1. For example, the ring counter 144 must not advance if the pawl 31 is not seated. The ring counter 144 must not advance if a jam is indicated. Otherwise, the ring counter 144 must advance if there is exposed intermediate in the storage station 16 or if a freshly printed copy is in the developing station 128. The ring counter 144 must advance if there is exposed intermediate in the exposure station 23 unless the copying machine has been set up to copy a page of a book. Also, the ring counter 144 must advance if the start switch 35 is pushed while the copying machine is in a book copy mode or if the start switch 35 is pushed when an original to be copied is placed in the entrance port.

Referring still to FIGURE 21 and particularly to the nand gate 128, it can be seen that if the ring counter is in state 6, the pawl 31 is in the notch 32, and there is no jam indicated, the inputs 6, H, and JI′ will be "1." If the output of the nand gate 127 is "1" at the same time, the output of the nand gate 128 is "0." It is obvious that the output of the nand gate 127 will be "1" if any of the inputs thereto are "0," even though the balance of the inputs are "1." Likewise, in order for the output of the nand gate 127 to be "0" to stop the advance of the ring counter 144, all of the inputs to said nand gate 127 must be "1." The inputs to the nand gate 127 are –0–, ––0, and the outputs of the nand gates 125 and 126. The input –0– is "1" except when –1– is "1" and the outputs for the nand gates 125 and 126 are normally "1." The inputs to the nand gate 126 are 1–– and B′. These two inputs are "1" to give the required "0" output for the nand gate 126 when the sequence includes exposure and the copying machine is not in the book copy mode. The nand gate 125 gives a "0" output when PB is "1" indicating that the start switch 35 has been operated and when the output of the nand gate 124 is "1." The inputs to the nand gate 124 are Y′ and B′. If Y′ or B′ is "0," indicating that there is an original in the entrance port or that the copying machine is in the book copying mode, the output of the nand gate 124 will be "1."

From the foregoing discussion, it can be seen that the output of the nand gate 128 is "0" when it is time for the ring counter 144 to advance from state 6 to state 1. The nand gates 131, 134, 136, 139 and 141 have comparable roles for advancing the ring counter from the other five states. The outputs of the five nand gates 131, 134, 136, 139 and 141 are all "1" at the all times except when one of them is giving the signal for the ring counter 144 to advance. Hence, the output of the nand gate 142 is "0" except for the times when the ring counter 144 must be advanced.

When the ring counter 144 must be advanced, the output of the nand gate 142 will be "1" and will be used to drive the timing circuit 143 a short period of time. The timing circuit 143 produces an output pulse which drives the ring counter 144. Once the ring counter 144 advances one state and unless all of the inputs to the subsequent states last nand gate are all "1," there will be all "1's" as an input to the nand gate 142 and the timing circuit 143 will not produce another output pulse until the copy machine functions cause the appropriate signals to exist.

Each state of the ring counter 144 is provided with a nand gate 145 through 150 used as an inverter so that a signal and its complement may be provided for each state.

The ring counter 144 advances from state 1 to state 2 when the meter roller 26 has nearly finished its revolution and when the intermediate in the storage station 16 is not the only intermediate exposed during the operating cycle. If the intermediate in the storage station 16 is the only intermediate exposed during the operating cycle, which is the condition where the shift register content is 010, it is the shift register which is advanced and not the ring counter 144. Hence, the nand gate 133 must have an output which is "1" when the shift register content is not 010. This condition is obtained by feeding the inputs 0––, –1–, and ––0 into the nand gate 133. The output of the nand gate 133 and the inputs 1, D, and A are fed into the nand gate 134 which will, therefore, have an output of "0" only when the content of the shift register is 010. The output of the nand gate 134 is fed into the nand gate 142.

The ring counter 144 advances from state 2 as soon as the pawl 31 falls into the notch 32 providing there is no jam indication and providing that the start switch 35 is depressed if a page of a book is about to be exposed. Hence, the inputs to the nand gate 138 are B, 1–– and PB′. The input PB′ is obtained by feeding PB into the nand gate 137. When the output of the nand gate 138 is "1," when JI′ is "1" because no jam is indicated, when H is "1" because the pawl 31 is seated in the notch 32, and when the input 2 is "1" because the ring counter 144 is in state 2, the nand gate 139 output will be "0" and, consequently, the output of the nand gate 142 will be "1."

When the intermediate is running in reverse at the end of an operating cycle, the same signals must be injected into the advancing circuits for states 3, 4 and 5 of the ring counter 144. It can be seen that the inputs 000, D, and A are fed into the nand gate 132 which has its output fed into the nand gates 130, 135, and 140. It will be remembered that when the ring counter 144 advanced, the advance multivibrator 87 is reset to change the input A to "0." Hence, the "0" output of the nand gate 132 is not sustained and the ring counter 144 is limited to a single count.

The ring counter 144 is advanced from state 3 if the clamp 24 is operated or if there is a "0" signal from the nand gate 132. The motor for the clamp 24 will never run while the intermediate is reversing. The other input to the nand gate 140 is C′ which is "0" only when the clamp 24 is fully operated. The output of the nand gate 140 will be "1" only when the ring counter 144 should advance from state 3. The output of the nand gate 140 is fed into the nand gate 141 along with the input 3. Hence, output of the nand gate 141 is "0" only when the ring counter 144 is in state 3 and the aforementioned conditions are such as to indicate an advance. The output of the nand gate 141 is fed as an input to the nand gate 142.

The ring counter 144 is advanced from state 4 when there is a "0" output from the nand gate 132 fed into the nand gate 135. Hence, output of the nand gate 141 is "0" only when the ring counter 144 is in state 3 and the aforementioned conditions are such as to indicate an advance. The output of the nand gate 141 is fed as an input to the nand gate 142.

The ring counter 144 is advanced from state 4 when there is a "0" output from the nand gate 132 fed into the nand gate 135 and when ET′ and DT′, which are also fed into the nand gate 135, are "0." Hence, the output of the nand gate 135 is "1" only when the conditions permit the ring counter 144 to advance from the state 4. The output of the nand gate 135 and the input 4 are fed into the nand gate 136. The output of the nand gate 136 is fed into the nand gate 142.

The ring counter 144 is advanced from state 5 when the clamp 24 is not operated and the shift register content is 000 or when the output of the nand gate 132 is "0." It is to be noted that the condition of the shift register is stipulated as 000 when the clamp 24 is unoperated. If this stipulation was not made, the ring counter 144 would advance at once from state 5 to state 6 when the intermediate is run in reverse because the clamp 24 must already be unoperated for the intermediate to run in reverse. When the clamp is not operated, U is "1" and when the shift register content is not 000, 000′ is "1." Both of these inputs, U and 000′, are fed into a nand gate 129 which provides a "0" output for the abovementioned conditions. The output of the nand gate 129 and the output of the nand gate 132 are fed into the nand gate 130. When either of the outputs from the nand gate 129 and 132 are "0," the output of the nand gate 130 will be "1." The output of the nand gate 130 and the input 5 are fed into the nand gate 131. The output of the nand gate 131 is fed into the nand gate 142.

The ring counter 144 is constructed so that when power is initially turned on, state 6 will be in effect.

Figure 22:
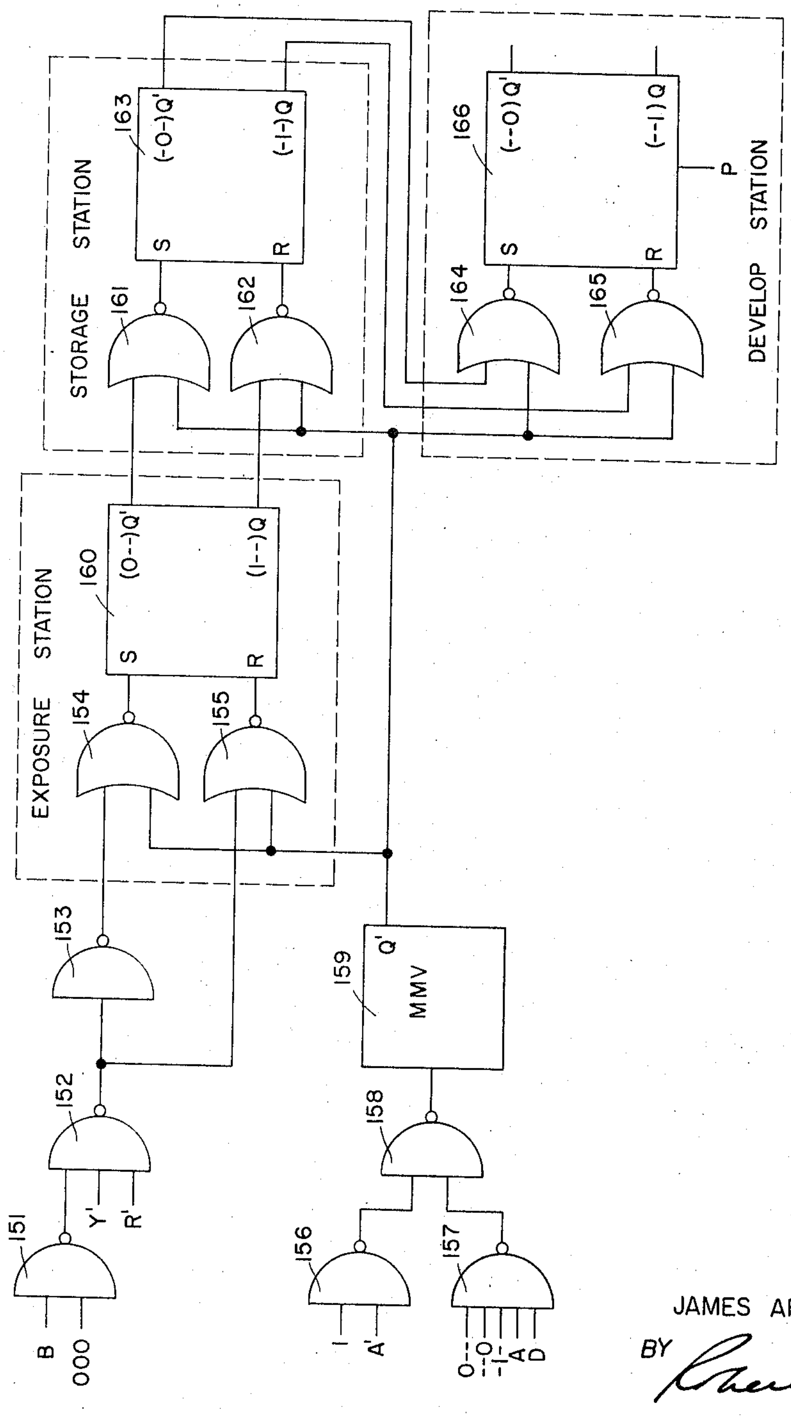
FIGURE 22 is a portion of the logic circuit associated with the exposure station, storage station, and developing station of the copying machine.

Referring now to FIGURE 22, an illustration of the shift register of the present invention can be discussed. The nand gates 151, 152, 153, 156, 157 and 158, the clock multivibrator 159, the nor gates 154, 155, 161, 162, 164 and 165 and the bistable multivibrators 160, 163 and 166 comprise the circuitry of the shift register.

The shift register has three stages, each consisting of a bistable multivibrator and two nor gates. In addition, the nand gate 153 is used as an inverter so that the two inputs to the first stage (nor gates 154 and 155 and the bistable multivibrator 160) will be complementary. The clock multivibrator 159 normally has an output of "1" and the operation of said clock causes the output to momentarily pulse to "0." The output of the clock multivibrator is fed as an input to the nor gates 154, 155, 161, 162, 164 and 165. The other input to each of the nor gates 161, 162, 164 and 165 is the output of the previous stage. The outputs from said previous stages are complements, that is Q and Q′. The input to one of the nor gates for each stage will be "1." When the clock pulse is provided to the nor gates from the clock multivibrator 159, said input to one of the nor gates for each stage remains "1" and the output of the nor gate remains "0." The input to the other nor gate for each stage is, therefore, "0" and the output for said nor gate is "1" or a positive pulse identical in length to the clock pulse. The bistable multivibrators 160, 163 and 166 set or reset, as the case may be, on the trailing or negative going edge of the output pulse of the preceding nor gates. The reason for triggering on the trailing edge of the clock pulse is that the bistable multivibrators 160, 163 and 166 might change states again in the presence of the clock signal and a new input signal from the previous register if said multivibrators were permitted to trigger on the leading edge.

The shift register is so constructed that the condition 000 will be present when power is initially turned on.

The input to the first stage of the shift register establishes whether or not the upcoming sequence will find an original to be exposed in the exposure station 23. The original will be there if the copying machine is in a book copying mode and the condition 000 is registered before the shift, if the original feed switch 111 is operated to provide a signal Y′, or if the reset relay 36 is in its operated position to provide a signal R′. The inputs 000 and B are fed into the nand gate 151. If both 000 and B are "0," the output of the nand gate 151 will be "1." The output of the nand gate 151 is fed into the nand gate 152 along with the inputs Y′ and R′. If any of the inputs to the nand gate 152 are "0," the output of said nand gate 152 will be "1" indicating that there is copy to be exposed in the upcoming sequence.

To set the bistable multivibrator 160, a "0" signal must be provided from the nor gate 154 to the S terminal. This dictates that the nand gate 153 inverter be placed between the output of the nand gate 152 and the input of the nor gate 154. Also, the output of the nand gate 152 must be connected directly to the nor gate 155.

The clock multivibrator 159 is a monostable multivibrator which produces a single output pulse when triggered by the positive going edge of the input signal. Unlike the ring counter 144, the shift register input signal is not removed when the shift register advances, so the clock multivibrator 159, with its single output pulse, is required.

The shift register is required to advance when the ring counter 144 advances from state 6 to state 1. The shift register is also required to advance when the copying machine is making a single copy and the exposed intermediate is in the storage station 16.

The inputs 1 and A′ are fed into the nand gate 156. The A′ signal is present so that when the advance multivibrator 87 sets, the signal will be removed to allow a second advance signal to be created. When both 1 and A′ are "1," the output of the nand gate 156 will be "0."

The second signal required to make the clock multivibrator 159 operate is provided by the nand gate 157. It must first be recognized that the shift register content must change from 010 to 001 when the meter roller switch first returns to its normal position so that the copy paper feed solenoid 30 will be energized at this time. The condition for advance of the shift register then is 010, A and D. A signal for 010′ is already available but an inverter would be necessary to make the signal usable. It is, therefore, easier to use 0−−, −1−, −−0, A and D as inputs to the nand gate 157. When all of the inputs to the nand gate 157 are "1," the output of said nand gate will be "0." The outputs of the nand gates 156 and 157 are fed into the nand gate 158 which has its output coupled to the clock multivibrator 159. When the outputs of the nand gates 156 and 157 are both "1," as is the normal case, the output of the nand gate 158 will be "0." When either of the outputs of the nand gates 156 and 157 is "0," the output of the nand gate 158 is "1" and the clock multivibrator 159 will be triggered. As stated previously, when the clock multivibrator 159 is triggered, the shift register is advanced.

Figure 23:
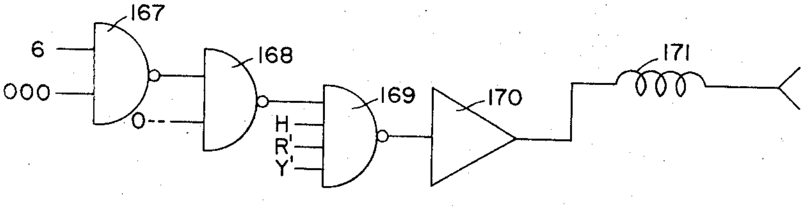
FIGURE 23 is a portion of the logic circuit associated with the sponge roller motor relay of the copying machine.

The sponge roller 21 motor relay 171 and the logic circuitry necessary to make it work is shown in FIGURE 23. The nand gates 167, 168 and 169 and the amplifier 170 are cooperatively connected to the sponge roller 21 motor relay. The sponge roller 21 motor can be operated by either of two contacts, the sponge roller motor relay 171 or by the count relay 39 contacts 41 via the normally closed contacts of the sponge roller motor relay 171. The latter is to accomplish operation during the last exposure of a multiple copy of one or more original. The book copy switch 112 is also in the circuit so that the sponge roller 21 motor will not run when a page of a book is being copied.

The logic required to pull in the sponge roller motor relay 171 is as follows. The relay 171 will never be pulled in when an original to be copied is in the entrance port, when the copying machine count relay 39 has been set for multiple copies, or during a sequence when exposure is to take place.

The condition 000 and state 6 is "at rest" and, therefore, the inputs 000 and 6 are fed into the nand gate 167. The output of the nand gate 167 is "0" when the sponge roller 21 motor should run. The output of the nand gate 167 and 0−− are fed into the nand gate 168. The input 0−− is also "0" when the sponge roller 21 motor should run. If either the output of the nand gate 167 or 0−− is "0," the output of the nand gate 168 will be "1." The output of the nand gate 168 and H, R′, and Y′ are fed into the nand gate 169. If all of the inputs to the nand gate 169 are "1," that is, if the machine is not in the book copy mode, the count relay 39 has not been set for multiple copies, and if the pawl 31 is seated in the notch 32, the output of the nand gate 169 will be "0" and the relay 171 will be energized through the amplifier 170.

The control system of the present invention can be easily expanded within the framework of this disclosure. That is, the use of a ring counter to establish the sequence of operation and a shift register to establish the condition of main elements of the copying system provides a unique basic for adding control functions.

The various switches such as the paper exit switch, clamp cam switches, and the original feed switches are sensing means for establishing circuit conditions for advancing the ring counter and shift register of the present invention.

The control system of the present invention, as hereinbefore described in one of its embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. A control system for an appliance having a predetermined sequence of operation comprising: a ring counter having a predetermined number of states, each of said states representing a step in said sequence of operation; a shift register having a predetermined number of stages for determining the condition of said appliance at any time within said sequence of operation, each of said stages representing the condition of a component of said appliance; sensing means associated with elements of said appliance for establishing circuit conditions for advancing said ring counter and said shift register; circuit means for connecting said ring counter to said shift register so as to advance said shift register for predetermined states of said ring counter; second circuit means for connecting said shift register to said ring counter so as to advance said ring counter for predetermined conditions of said shift register; third circuit means for connecting said sensing means to said ring counter and shift register; and fourth circuit means for connecting the outputs of said ring counter, said shift register, and said sensing means to elements of said appliance so as to energize said elements during predetermined steps of said sequence of operation.

2. A control system as in claim 1 wherein each stage of said shift register is comprised of two nor gates and a bistable multivibrator.

3. A control system as in claim 1 wherein there are means connected to said appliance for changing said sequence of operation.

4. A control system as in claim 1 wherein there are timing circuits connected to said ring counter for establishing circuit conditions necessary for advancing said ring counter.

5. A control system for a copying machine of the type having a means for exposing an intermediate material with an original to be copied, a means for developing copy paper with said intermediate material exposed with said original, and a predetermined sequence of operation, said control system comprising: a ring counter having a predetermined number of states, each of said states representing a step in said sequence of operation; a shift register for determining the condition of said copying machine at any time within said sequence of operation, said shift register having a stage corresponding to said exposing means and a stage corresponding to said developing means; sensing means cooperatively associated with elements of said copying machine for establishing circuit conditions for advancing said ring counter and said shift register; circuit means for connecting said ring counter to said shift register so as to advance said shift register for predetermined states of said ring counter; second circuit means for connecting said shift register to said ring counter so as to advance said ring counter for predetermined conditions of said shift register; third circuit means for connecting said sensing means to said ring counter and said shift register; and fourth circuit means for connecting the outputs of said ring counter, said shift register, and said sensing means to elements of said copying machine so as to energize said elements during predetermined steps of said sequence of operation.

6. A control system as in claim 5 wherein there is a timing circuit cooperatively associated with said exposing means for establishing a circuit condition necessary for advancing said ring counter.

7. A control system as in claim 5 wherein there is a timing circuit cooperatively associated with said developing means for establishing a circuit condition necessary for advancing said ring counter.

8. A control system as in claim 5 wherein said shift register has a stage corresponding to a storage station of said copying machine, said stage being located between said stage corresponding to said exposing means and said stage corresponding to said developing means.

9. A control system as in claim 5 wherein there is a clock circuit for advancing said shift register when said shift register, said ring counter, and said sensing means are in a predetermined condition, said clock circuit being connected to each stage of said shift register.

10. A control system as in claim 5 wherein there is a monostable multivibrator circuit for advancing said shift register when said shift register, said ring counter, and said sensing means are in a predetermined condition, said monostable multivibrator circuit being connected to each stage of said shift register.

11. A control system as in claim 5 wherein there is a signal and its complement provided as an output for each stage of said ring counter.

12. A control system as in claim 5 wherein there are means connected to said appliance for changing said sequence of operation.

13. A control system as in claim 5 wherein there are means connected to said shift register for advancing said shift register so as to cause said copying machine to provide multiple copies.

14. A control system as in claim 5 wherein there is a sensing means for determining when developed copy cannot exit said copying machine so as to stop the advancement of said ring counter and said shift register and connected to each.

15. A control system for a device having a predetermined sequence of operation comprising: a shift register having a predetermined number of stages for determining the condition of the device at any time within the sequence of operation, each of said stages representing the condition of a component of said device; sensing means coupled to elements of said device for establishing circuit conditions for advancing said shift register; gating means connected between said sensing means and said shift register for advancing said shift register upon establishment of said circuit conditions; and circuit means for connecting the output of said shift register and said sensing means to elements of said device so as to energize said elements during predetermined steps of said sequence of operation.

16. The control system of claim 15, wherein the state of each of said stages of said shift register represents a condition of each stage of said device.

17. The control system of claim 15 further including timing means and second gating means connected between said sensing means and said circuit means, said second gating means actuating said timing means, said timing means energizing elements of said device through said circuit means.

18. The control system of claim 17, wherein the output of said shift register is connected to said second gating means so as to actuate said timing means in response to said output of shift register.

19. The control system of claim 15 further including a ring counter and additional gating means connected between said sensing means and said circuit means, said additional gating means actuating said ring counter, said ring counter energizing elements of said device through said circuit means.

20. The control system of claim 19, wherein said output of said ring counter is connected to said additional gating means causing said conditions under which said ring counter advances dependent upon said state of said ring counter.

21. The control system of claim 20, wherein said output of said shift register is connected to said additional gating means actuating said ring counter in response to said output of said shift register.

22. The control system of claim 20, wherein the output of said ring counter is connected to said first gating means actuating said shift register in response to said output of said ring counter.

23. The control system of claim 20, wherein said output of said shift register is connected to said additional gating means and said output of said ring counter is connected to said first gating means actuating said ring counter in response to said output of said shift register and actuating said shift register in response to said output of said ring counter.

24. The control system of claim 23, further including timing means and second gating means connected between said sensing means and said circuit means, said second gating means actuating said timing means, said timing means energizing elements of said device through said circuit means.

25. The control system of claim 24, wherein said output of said timing means is connected to said additional gating means, actuating said ring counter in response to said output of said timing means.

26. The control system of claim 25, wherein said output of said ring counter is connected to said second gating means, actuating said timing means in response to said output of said ring counter.

27. The control system of claim 26, wherein said output of said shift register is connected to said second gating means, actuating said timing means in response to said output of said shift register.

References Cited

UNITED STATES PATENTS

| | | | |
|---|---|---|---|
| 3,286,230 | 11/1966 | Bolton | 328—37 XR |
| 3,362,014 | 1/1968 | Hauck | 328—37 XR |
| 3,363,185 | 1/1968 | Sanderson et al. | 328—72 |

JOHN S. HEYMAN, *Primary Examiner.*

S. D. MILLER, *Assistant Examiner.*

U.S. Cl. X.R.

328—37, 75, 92